(12) United States Patent
Elhadeedy et al.

(10) Patent No.: US 12,548,383 B2
(45) Date of Patent: Feb. 10, 2026

(54) DYNAMIC AUTONOMOUS VEHICLE MODEM ORCHESTRATION

(71) Applicant: Motional AD LLC, Boston, MA (US)

(72) Inventors: Ahmed Elhadeedy, Pittsburgh, PA (US); Syed Tirmizi, Mars, PA (US); Sim Wonseon, Pittsburgh, PA (US); William Lu, Somerville, MA (US)

(73) Assignee: Motional AD LLC, Boston, MA (US)

( * ) Notice: Subject to any disclaimer, the term of this patent is extended or adjusted under 35 U.S.C. 154(b) by 398 days.

(21) Appl. No.: 18/167,103

(22) Filed: Feb. 10, 2023

(65) Prior Publication Data
US 2024/0127633 A1    Apr. 18, 2024

Related U.S. Application Data

(60) Provisional application No. 63/416,281, filed on Oct. 14, 2022.

(51) Int. Cl.
*G07C 5/00* (2006.01)
*H04W 74/04* (2009.01)

(52) U.S. Cl.
CPC .......... *G07C 5/008* (2013.01); *H04W 74/04* (2013.01)

(58) Field of Classification Search
CPC .. G07C 5/008; H04W 72/542; H04W 72/569; H04W 74/04
See application file for complete search history.

(56) References Cited

U.S. PATENT DOCUMENTS

| | | | |
|---|---|---|---|
| 2018/0088931 A1* | 3/2018 | Caushi | G06F 16/951 |
| 2018/0279175 A1* | 9/2018 | Gholmieh | H04L 47/6215 |
| 2021/0111922 A1* | 4/2021 | Sano | H04L 69/22 |
| 2021/0274595 A1* | 9/2021 | McConnell | H04W 84/005 |

OTHER PUBLICATIONS

International Search Report and Written Opinion received for PCT Application No. PCT/US2023/076440, mailed Jan. 24, 2024.
SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.
International Preliminary Report received for PCT Application No. PCT/US2023/076440, mailed Apr. 24, 2025.

\* cited by examiner

*Primary Examiner* — Kashif Siddiqui
(74) *Attorney, Agent, or Firm* — Knobbe, Martens, Olson & Bear, LLP

(57) ABSTRACT

Provided are methods for dynamic orchestration of modems in an autonomous vehicle, which can include an SoC determining performance parameters from a plurality of modems and controlling communication of data between ECUs and the modems. Some methods described also include an SoC acting as a forwarding daemon, communicating with a switch, and or providing configuration data. Systems and computer program products are also provided.

20 Claims, 8 Drawing Sheets

DYNAMIC AUTONOMOUS VEHICLE MODEM ORCHESTRATION

CROSS-REFERENCE TO RELATED APPLICATIONS

The present application claims priority/benefit from U.S. Provisional Application No. 63/416,281 filed on Oct. 14, 2022, entitled "DYNAMIC AUTONOMOUS VEHICLE MODEM ORCHESTRATION," which is herein incorporated by reference in its entirety.

BACKGROUND

Autonomous vehicles (AVs) typically include many electronic control units (ECUs) which in turn require Long Term Evolution and/or 5G access via modems, to download or upload data. Traditionally, ECUs are assigned to a particular modem. In other words, data is routed via a predefined modem and local network. However, it may arise that a certain modem faces temporary poor conditions, which may impact prioritized traffic produced by a certain ECU and handled by the modem as the ECU is assigned to one modem at all times. It may also arise that said modem and/or network associated with the modem have increased traffic. There may also be multiple ECUs that try to access and use the same modem simultaneously, leading to performance issues.

DETAILED DESCRIPTION

Figure 1:
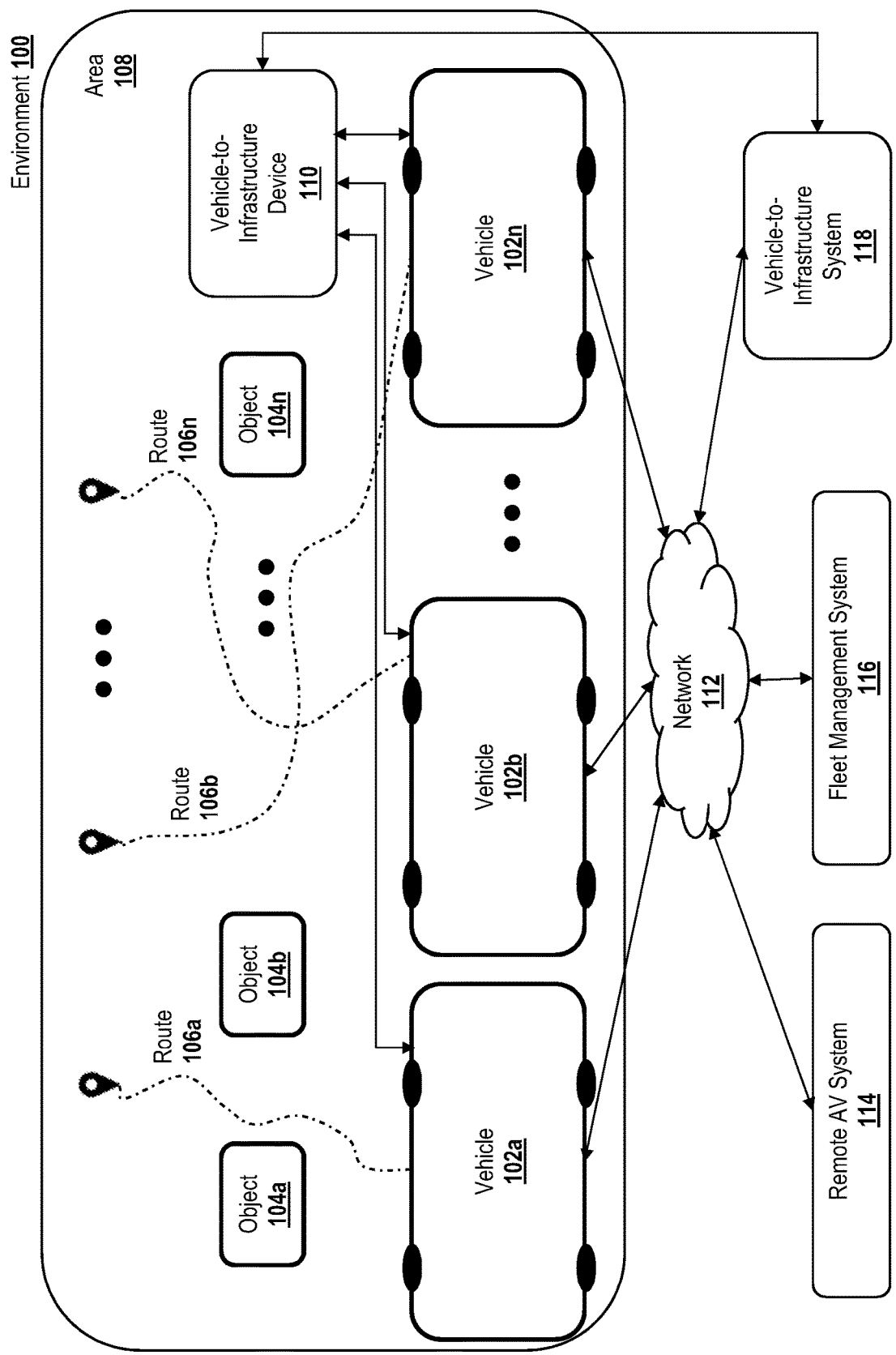
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

"At least one," and "one or more" includes a function being performed by one element, a function being performed by more than one element, e.g., in a distributed fashion, several functions being performed by one element, several functions being performed by several elements, or any combination of the above."

Some embodiments of the present disclosure are described herein in connection with a threshold. As described herein, satisfying, such as meeting, a threshold can refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement dynamic autonomous vehicle modem control and orchestration. In particular, the present disclosure relates to a system, such as an integrated hardware-software system including at least one processor, such as a system on a chip (SoC) that provides for dynamic control and orchestration (e.g., coordination) between electronic control units (ECUs) and modems in an autonomous vehicle. The system can evaluate signal performance of each modem, identify priority and/or demand from each ECU, and control instructions to the ECUs and/or the modems, e.g., either instruct the ECUs and/or modems and/or act as a gateway between the ECUs and modems. The system is configured to execute the disclosed techniques on one or more processors. In some examples, the system is configured to execute the disclosed techniques on a processor configured to receive data from a wireless communication system. In some examples, the system is configured to execute the disclosed technique on a processor independent from the processor receiving the data from a wireless communication system. In some examples, the system is configured to execute the disclosed technique on a processor communicatively coupled to the processor receiving the data from a wireless communication system.

By virtue of the implementation of systems, methods, and computer program products described herein, techniques for dynamic autonomous vehicle modem orchestration can advantageously provide for the reliability of performance of communication services, as well as the prioritization of critical data. Further, the disclosure allows for an increase in the network availability for all ECUs. Additionally, the disclosure advantageously prevents the flooding of available, especially when limited, resources (e.g., modems and/or networks) with low priority data. For example, the disclosure allows for control, orchestration and prioritization between the ECUs and the available modems of an AV.

Additionally, the disclosure utilizes SoCs rather than switches for a number of advantages. For example, switches do not have the necessary computing and processing power for the operations disclosed herein, such as controlling connections between a modem and an ECU. Moreover, switches cannot query the signal quality (e.g., indicated by a performance parameter) from each modem. Advantageously, the SoCs are capable of interfacing with multiple modems, network nodes (e.g., in the cloud), and the ECUs simultaneously.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and ends at a final goal state (e.g., a state that corresponds to a second spatiotemporal location that is different from the first spatiotemporal location) or goal region (e.g., a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure or Vehicle-to-Everything (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

Figure 8:
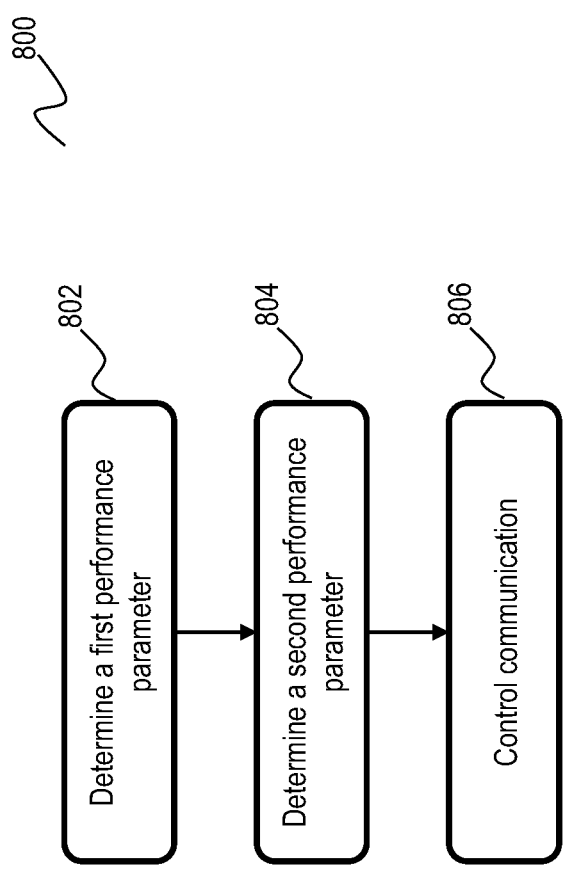
FIG. 8 is a flowchart of an example process for dynamic autonomous vehicle modem orchestration.

In some embodiments, device 300 is configured to execute software instructions of one or more steps of the disclosed method, as illustrated in FIG. 8.

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
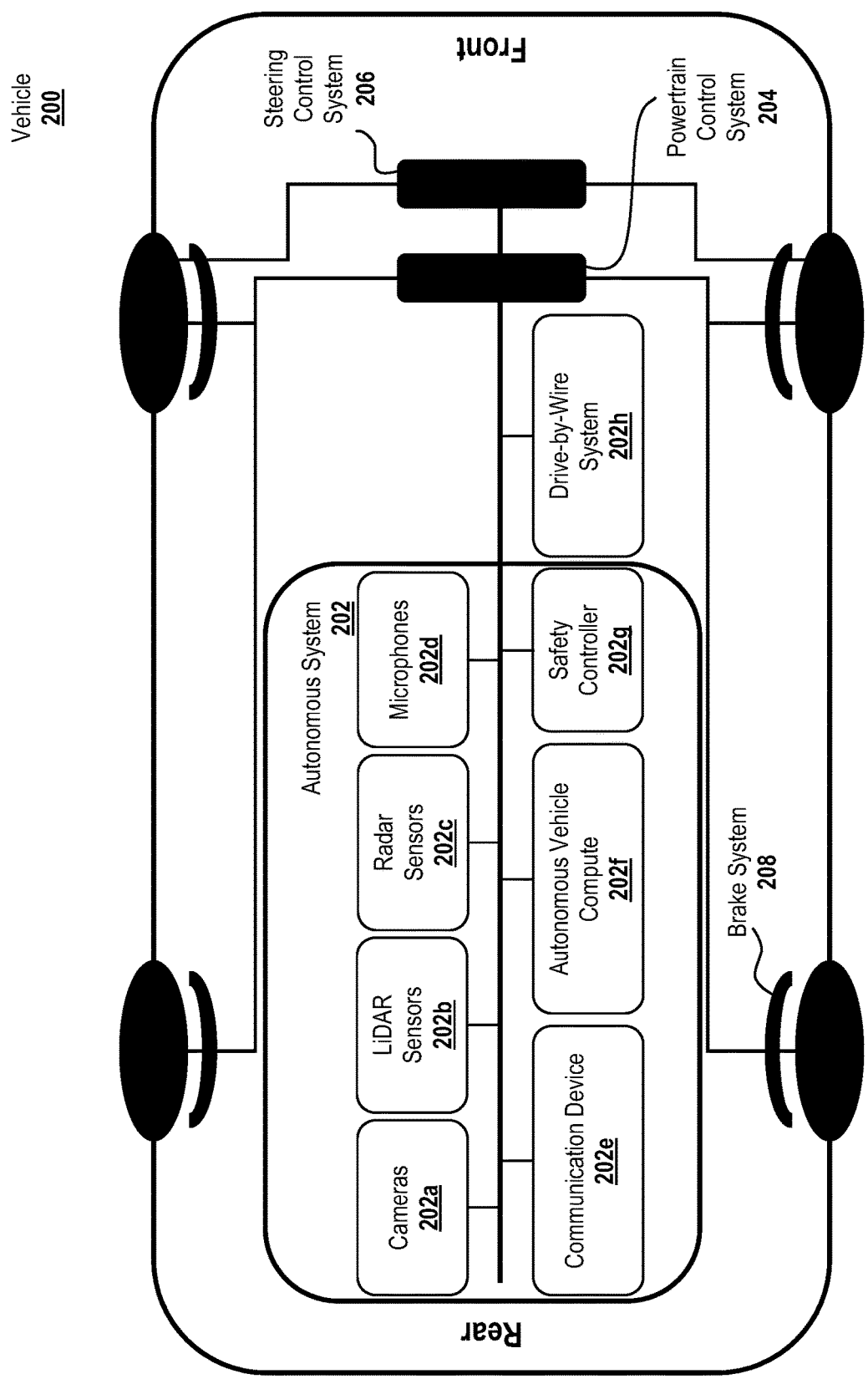
FIG. 2 is a diagram of one or more example systems of a vehicle including an autonomous system.

Referring now to FIG. 2, vehicle 200 (which may be the same as, or similar to vehicle 102 of FIG. 1) includes or is associated with autonomous system 202, powertrain control system 204, steering control system 206, and brake system 208. In some embodiments, vehicle 200 is the same as or similar to vehicle 102 (see FIG. 1). In some embodiments, autonomous system 202 is configured to confer vehicle 200 autonomous driving capability (e.g., implement at least one driving automation or maneuver-based function, feature, device, and/or the like that enable vehicle 200 to be partially or fully operated without human intervention including, without limitation, fully autonomous vehicles (e.g., vehicles that forego reliance on human intervention such as Level 5 ADS-operated vehicles), highly autonomous vehicles (e.g., vehicles that forego reliance on human intervention in certain situations such as Level 4 ADS-operated vehicles), conditional autonomous vehicles (e.g., vehicles that forego reliance on human intervention in limited situations such as Level 3 ADS-operated vehicles) and/or the like. In one embodiment, autonomous system 202 includes operational or tactical functionality required to operate vehicle 200 in on-road traffic and perform part or all of Dynamic Driving Task (DDT) on a sustained basis. In another embodiment, autonomous system 202 includes an Advanced Driver Assistance System (ADAS) that includes driver support features. Autonomous system 202 supports various levels of driving automation, ranging from no driving automation (e.g., Level 0) to full driving automation (e.g., Level 5). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, drive-by-wire (DBW) system 202h, and safety controller 202g.

Figure 3:
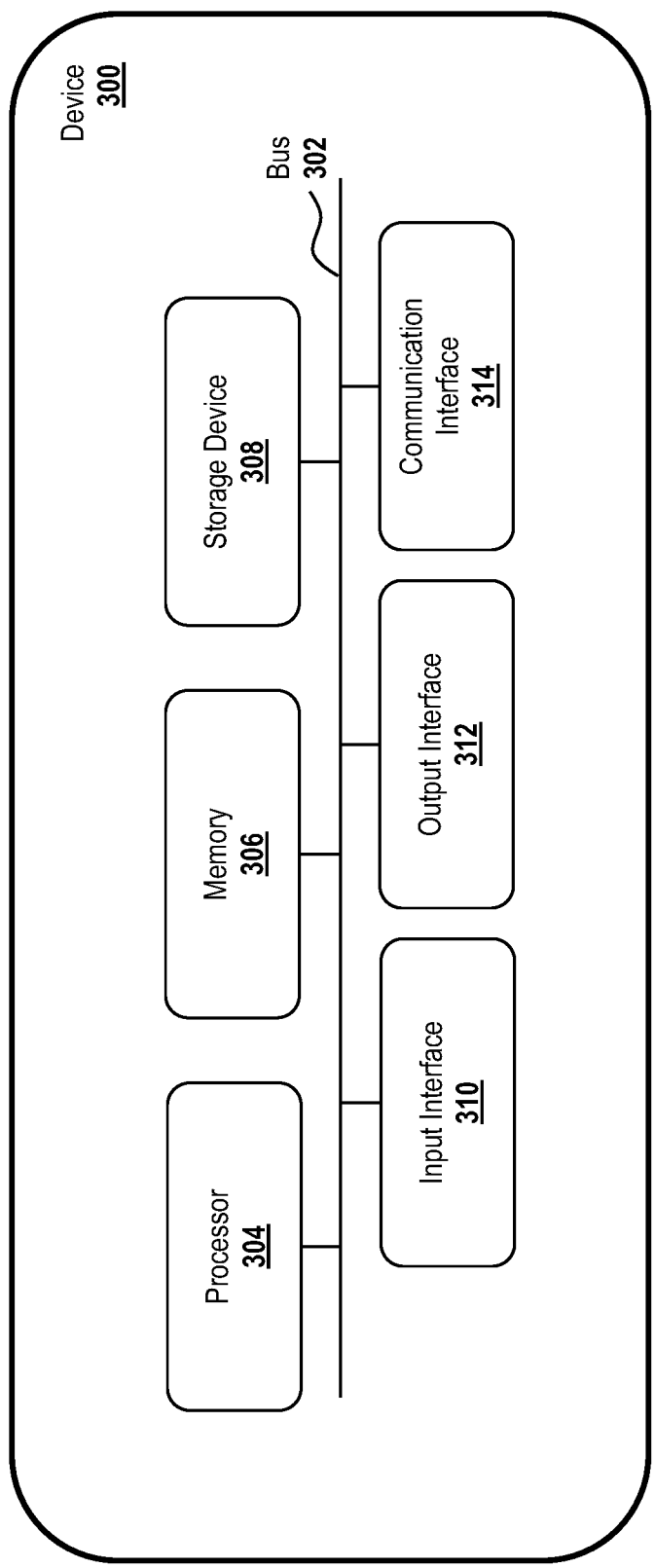
FIG. 3 is a diagram of components of one or more example devices and/or one or more example systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a Charge-Coupled Device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD (Traffic Light Detection) data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Light Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object.

In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum. In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e includes at least one device configured to be in communication with cameras 202a, LiDAR sensors 202b, radar sensors 202c, microphones 202d, autonomous vehicle compute 202f, safety controller 202g, and/or DBW (Drive-By-Wire) system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like), a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 make longitudinal vehicle motion, such as to start moving forward, stop moving forward, start moving backward, stop moving backward, accelerate in a direction, decelerate in a direction or to make lateral vehicle motion such as performing a left turn, performing a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate. In other words, steering control system 206 causes activities necessary for the regulation of the y-axis component of vehicle motion.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like. Although brake system 208 is illustrated to be located in the near side of vehicle 200 in FIG. 2, brake system 208 may be located anywhere in vehicle 200.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), at least one device of remote AV system 114, fleet management system 116, V2I system 118, and/or one or more devices of network 112 (e.g., one or more devices of a system of network 112). In some embodiments, one or more devices of vehicles 102 (e.g., one or more devices of a system of vehicles 102 such as at least one device of remote AV system 114, fleet management system 116, and V2I system 118, and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some cases, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4:
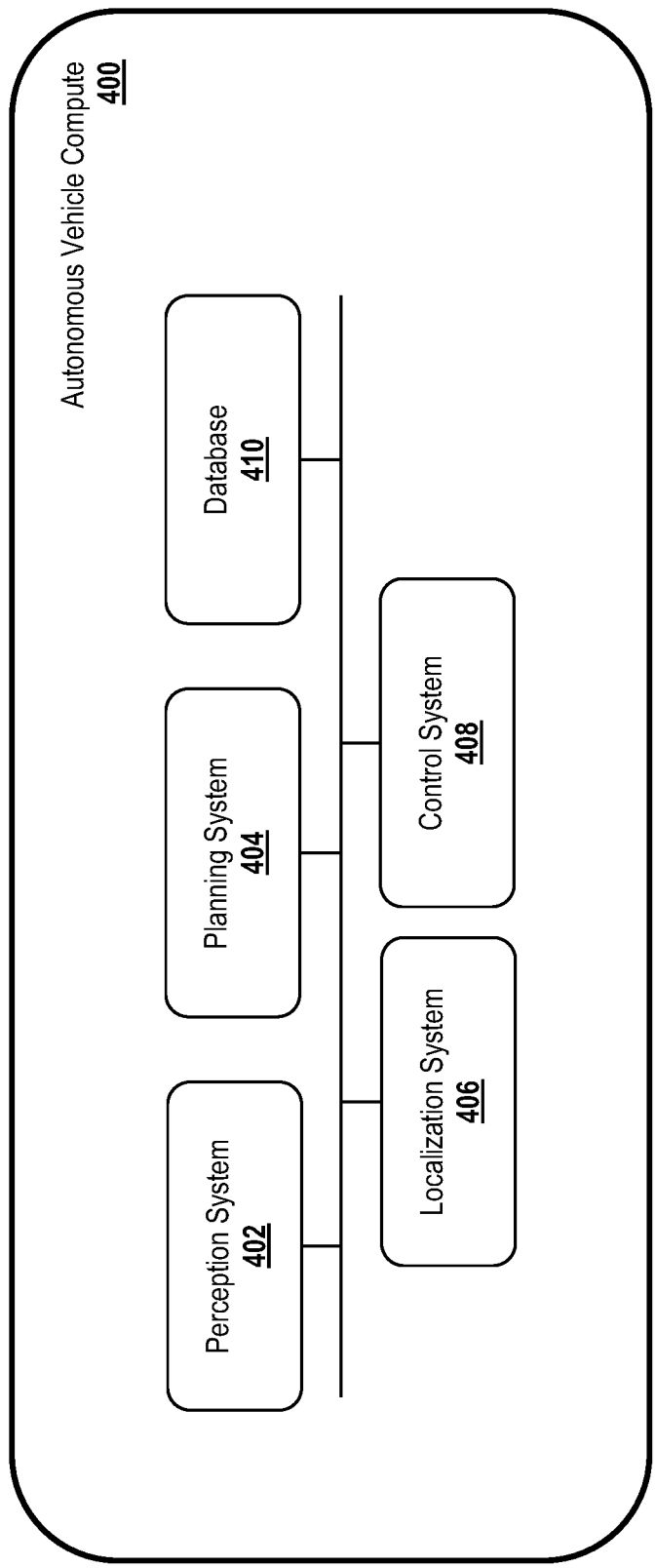
FIG. 4 is a diagram of certain components of an example autonomous system.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits (ASICs), Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In other words, planning system 404 may perform tactical function-related tasks that are required to operate vehicle 102 in on-road traffic. Tactical efforts involve maneuvering the vehicle in traffic during a trip, including but not limited to deciding whether and when to overtake another vehicle, change lanes, or selecting an appropriate speed, acceleration, deacceleration, etc. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. For example, control system 408 is configured to perform operational functions such as a lateral vehicle motion control or a longitudinal vehicle motion control. The lateral vehicle motion control causes activities necessary for the regulation of the y-axis component of vehicle motion. The longitudinal vehicle motion control causes activities necessary for the regulation of the x-axis component of vehicle motion. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 5:
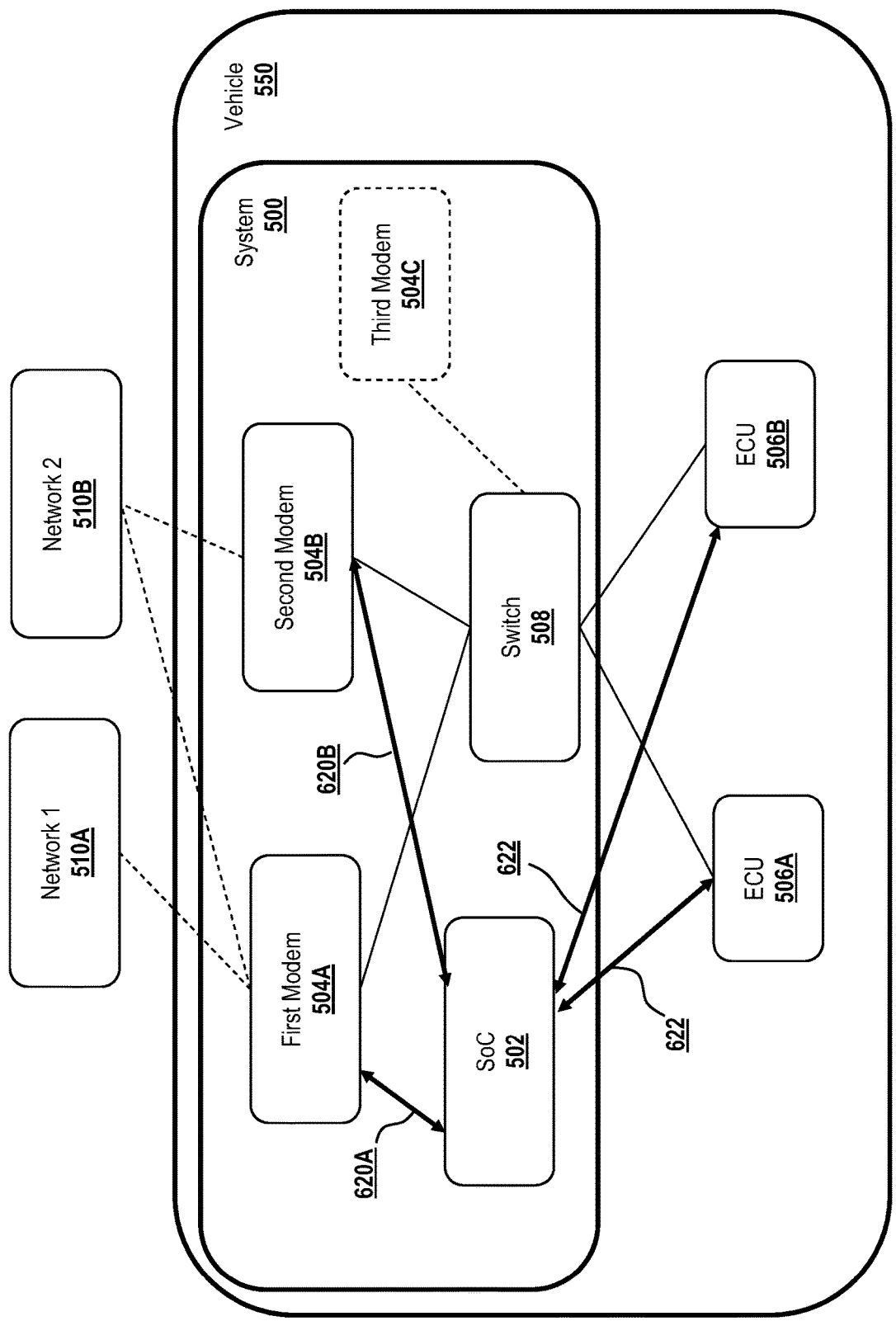
FIG. 5 is a diagram of an example implementation of a process for dynamic autonomous vehicle modem orchestration.
Figure 6:
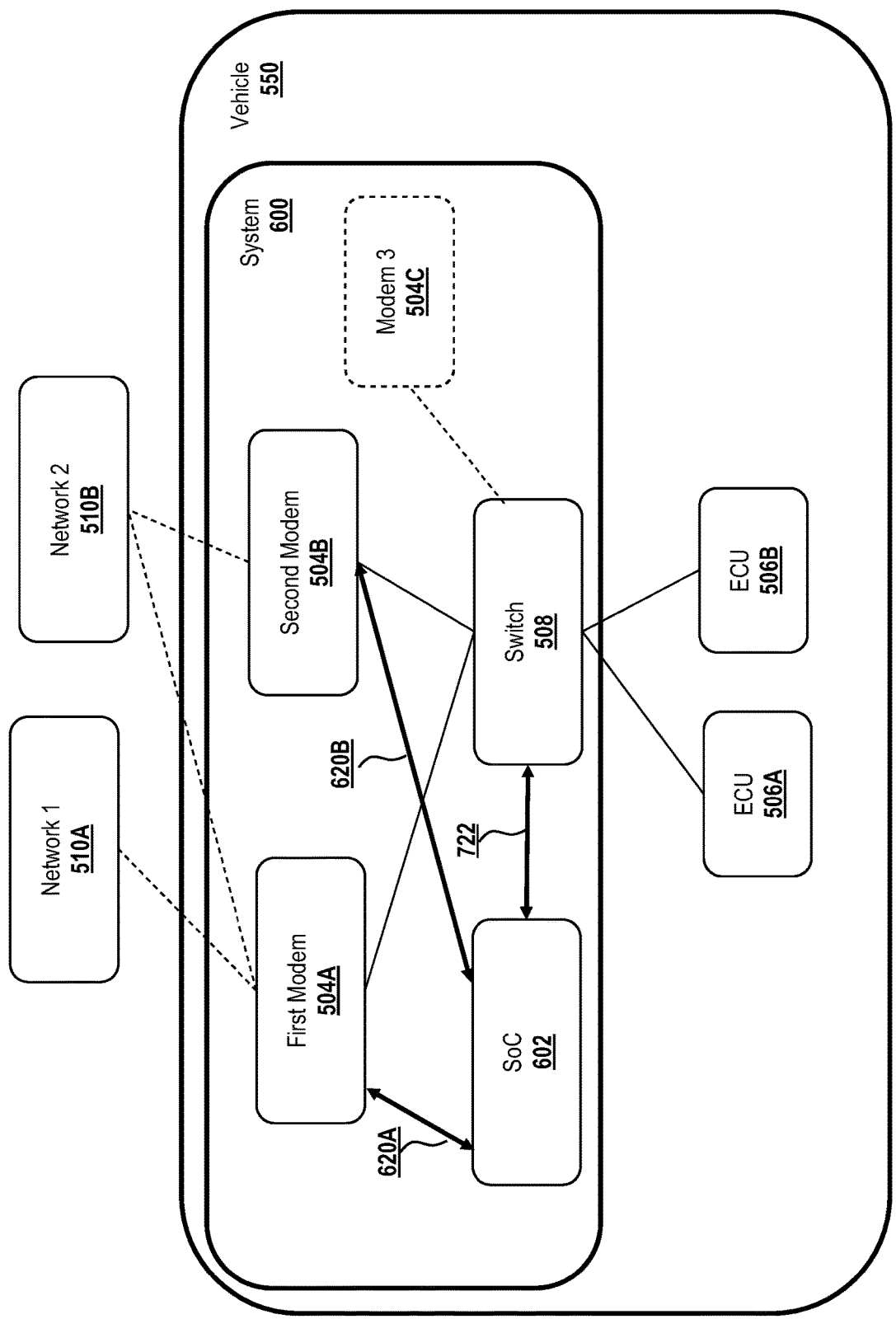
FIG. 6 is a diagram of an example implementation of a process for dynamic autonomous vehicle modem orchestration.
Figure 7:
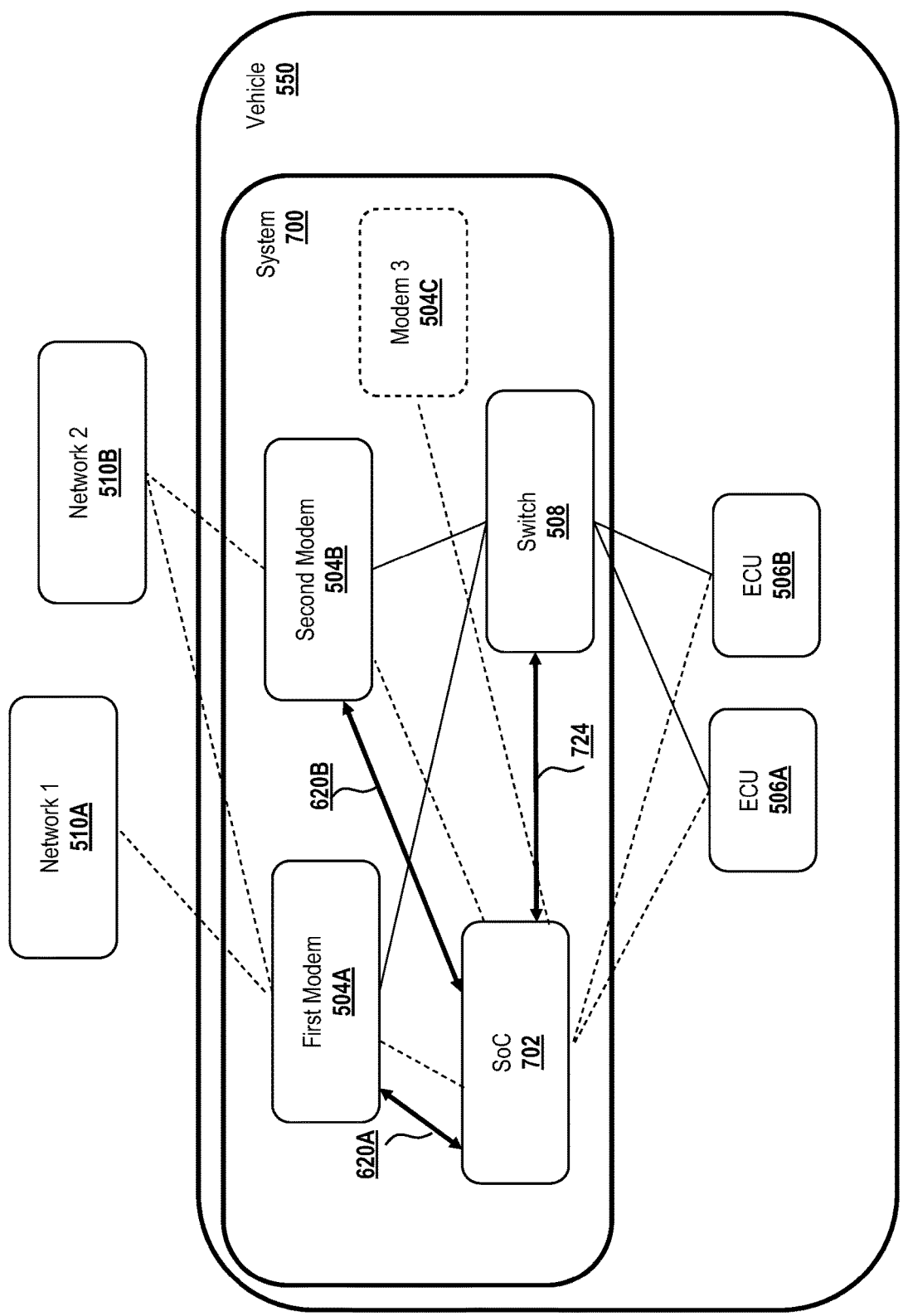
FIG. 7 is a diagram of an example implementation of a process for dynamic autonomous vehicle modem orchestration.

Referring now to FIGS. 5-7, illustrated are diagrams of systems 500, 600, 700 for dynamic autonomous vehicle modem control and/or orchestration. In some embodiments, systems 500, 600, 700 is connected with and/or incorporated in a vehicle 550 (e.g., an autonomous vehicle, AV, that is the same as, or similar to, vehicle 200 of FIG. 2). In one or more embodiments or examples, system 500, 600, 700 is in communication with and/or a part of an AV (e.g., such as autonomous system 202 illustrated in FIG. 2, device 300 of FIG. 3), an AV system, an AV compute (such as AV compute 202f of FIG. 2 and/or AV compute 400 of FIG. 4), a remote AV system (such as remote AV system 114 of FIG. 1), a fleet management system (such as fleet management system 116 of FIG. 1), and a V2I system (such as V2I system 118 of FIG. 1).

In one or more embodiments or examples, the system 500, 600, 700 is in communication with one or more of: a device (such as device 300 of FIG. 3), a communication interface (such as communication interface 314 of FIG. 3), communication device (such as communication device 202e of FIG. 2), devices of a network (such as one or more devices of network 112 of FIG. 1), and a control system (such as the control system 408 of FIG. 4).

In one or more embodiments or examples, the system 500, 600, 700 includes a first modem 504A, a second modem 504B, and a plurality of Electronic Control Units (ECUs) 506A, 506B. In one or more embodiments or examples, the system 500, 600, 700 includes at least one System on a Chip (SoC) 502, 602, 702 communicably coupled with the modems 504A, 504B and each of the plurality of ECUs 506A, 506B in order to carry out particular operations. In one or more embodiments or examples, the SoC 502, 602, 702, is configured to determine performance parameters for respective modems (e.g., performance parameters 620A, 620B for modems 504A, 504B respectively). In one or more embodiments or examples, the SoC is configured to control communication of data between at least one of a plurality of ECUs and one of the modems based on the performance parameters. In one or more examples, the term "ECU" can be used interchangeably with the term "processor". In some examples, the ECU is an embedded system, e.g. in automotive electronics that controls one or more of the electrical systems or subsystems in a vehicle, such as an AV. In some examples, the ECU includes one or more of: an engine control module, a powertrain control module, a transmission control module, a brake control module, a central control module, a central timing module, a general electronic module, a body control module, and a suspension control module.

In some examples, the SoC is an integrated circuit that includes a processor, a memory and an interface (e.g. one or more modems). Examples of SoCs include an application specific integrated circuit, and/or a field programmable gate array. For example, the SoC includes peripherals associated with the interface, a microprocessor and/or a microcontroller, and/or one or more modems. Example of peripherals include one or more of: counter-timers, a real-time timer, a power-on reset generator, a voltage regulator, and a power management circuit.

In other words, SoCs 502, 602, 702 (for example, within an architecture) can be used to dynamically control data traffic between modems 504A, 504B (e.g., local network route) and ECUs 506A, 506B of the system 500, 600, 700. Further, the SoCs 502, 602, 702 is capable of controlling communication (e.g., control data flow) between the modems 504A, 504B, servers (e.g., network 510A, 510B), and/or the ECUs 506A, 506B in either direction (e.g., uplink, downlink). This can allow for improved data flow for busy and/or problematic communications between the ECUs 506A, 506B and servers by means of modems 504A, 504B, as well as prioritization of important data. The system 500, 600, 700 can have further ECUs, modems, and networks not shown in the figures, such as a respective third, fourth, fifth, etc. ECU, modem, and network.

In one or more examples or embodiments, different ECUs 506A, 506B have different purposes, such as for controlling a passenger display (sometimes referred to as an in-cabin display), a camera monitoring system (CMS), etc. In some examples, certain ECUs require higher data throughput and/or bandwidth, such as for audio and/or video streaming, which may overwhelm (e.g., congest a link for data communication) a particular modem 504A, while another modem 504B can handle such a data throughput. In other words, a particular modem 504A, 504B can be susceptible to congestion when certain ECUs 506A, 506B request communication of data that requires more bandwidth (e.g., high requirements on throughput). In this example, the SoC 502, 602, 702 is configured to focus the video streaming ECU data into one of the modems (such as first modem 504A), and all other data into another modem (such as second modem 504B). In other words, the SoC 502, 602, 702 is configured to communicate the video streaming ECU data via one of the modems, and remaining data (e.g., from other ECUs intending to access to a server) via another modem, for example.

In one or more examples or embodiments, the SoC 502, 602, 702 analyzes the performance of the modems 504A, 504B and determines which modem 504A, 504B may be communicating with and/or serving the ECUs 506A, 506B by measuring signal quality (e.g., which modem 504A, 504B enables improved performance, such as signal strength and/or reliability of traffic data). In one or more examples or embodiments, modems 504A, 504B are configured to communicate (e.g., transmit and receive data) with different networks, such as network 510A and network 510B. The networks 510A, 510B can be for different types of data communication (e.g., different communication scenarios, different type of communication systems, different radio conditions, different network operators), for example ride-sharing, telecommunication, system maintenance and/or assistance, entertainment, etc. In some examples, the system 500 further includes a switch 508 (e.g., ethernet switch) in communication with one or more of the modems 504A, 504B and ECUs 506A, 506B. The switch 508 can change the data path and/or route the data between the ECUs 506A, 506B and the modems 504A, 504B. The SoC 502, 602, 702 can be configured to control how data between the modems 504A, 504B and the ECUs 506A, 506B is provided and/or routed through the switch 508. In other words, the SoC 502, 602, 702 can evaluate the signal quality of each modem 504A, 504B (and/or usable bandwidth), identify the demand and/or need and the priority for each ECU 506A, 506B trying to access the network 510A, 510B for communication of the data, and then provide instructions on which modem 504A, 504B to use and/or which local network route to use.

In one or more examples or embodiments, the SoC 502, 602, 702 is configured to determine a performance parameter of the modem (such as a first performance parameter 620A of the first modem 504A, second performance parameter 620B of the second modem 504B, etc.). For example, the SoC 502, 602, 702 continuously determines the performance parameter(s) 620A, 620B. Alternatively, the SoC 502, 602, 702 can determine the performance parameter(s) 620A, 620B at particular intervals and/or upon a data transmission request. In some examples, the performance parameter 620A, 620B is indicative of a cellular performance of the respective modem 5040A, 504B. For example, cellular performance includes one or more of: bandwidth, signal performance, signal to interference & noise ratio (SINR), received signal strength indicator (RSSI), reference signal received quality (RSRQ), reference signal received power (RSRP), and signal to noise ratio (SNR). In one or more examples or embodiments, the performance parameter(s) 620A, 620B are indicative of available bandwidth (e.g., available local ethernet bandwidth between modem 504A and switch 508).

In some examples, the SoC 502, 602, 702 controls communication of data between at least one of the plurality of ECUs 506A, 506B and one of the modems 504A, 504B. In some examples, the SoC 502, 602, 702 controls communication of data between each of the plurality of ECUs 506A, 506B and one of the modems 504A, 504B. In one or more examples or embodiments, controlling communication of the data includes organizing, scheduling, preparing, setting up, routing, and/or rerouting the data. In one or more examples or embodiments, controlling communication of the data includes selecting the modem to be used for communication of the data and informing the ECUs of their respective selected modem, for example using a modem identifier associated with the modem. In other words, the SoC 502, 602, 702 dynamically configures different ECUs 506A, 506B to communicate data with respective modems 504A, 504B. For example, the SoC 502, 602, 702 compares the first performance parameter 620A with the second performance parameter 620B. In some examples, the SoC 502, 602, 702 controls communication of data between an ECU of the plurality of ECUs 506A, 506B and the modem 504A, 504B having the highest performance as indicated by the respective performance parameter 620A, 620B. For example, the modem having the better performance may be assigned by the SoC for transmitting and/or receiving data for a given ECU requiring a larger throughput or more prioritized data. There may be instances where the SoC 502, 602, 702 controls communication of data between an ECU of the plurality of ECUs 506A, 506B and the modem 504A, 504B having the lowest performance as indicated by the respective performance parameter 620A, 620B, such as for low priority data transmission. For example, the modem having a worse performance may be assigned by the SoC for transmitting and/or receiving data for a given ECU requiring a lower throughput or less prioritized data.

In one or more embodiments or examples, the SoC 502, 602, 702 is further configured to determine and/or obtain a priority parameter associated with the data. The SoC 502, 602, 702 can then control the communication of data based on the priority parameter. For example, the priority parameter associated with the data is indicative of a traffic type of the data. The traffic type is for example a Quality of Service, QoS, class. The traffic type for example indicates if the data is real-time data, or non-real-time data, best effort data, conversational data, low-latency data and/or ultra-reliable data. In one or more examples or embodiments, the priority parameter is predefined. Alternatively, the priority parameter can be dynamic, such as deterministic based on the traffic type. The SoC 502, 602, 702 can determine as a performance parameter the available bandwidth between each modem 504A, 504B and the switch 508. In this manner, the SoC 502, 602, 702 can be configured to dynamically adjust the routing of the data via one of the modems based on the performance parameter and on whether the data should be prioritized or not. For example, for traffic types such as real-time data and/or low-latency data, the SoC 502, 602, 702 prioritizes the data over other types of data to the modem that has the higher performance parameter. In some examples, the data is prioritized based on a combination of the traffic type of the data and an additional parameter, such as a time parameter. For example, a certain type of data (e.g., class of data) is temporarily prioritized during a specific phase of the autonomous vehicle ride because that particular type of data is only critical during that vehicle state. For example, a modem (e.g., modem 504A) is assigned by the SoC 502, 602, 702 to serve a corresponding ECU (e.g., ECU 506A) for communication of data associated with higher requirements on bandwidth and/or throughput and/or latency (e.g., increased bandwidth and/or increased throughput and/or low latency).

FIG. 5 illustrates an example system 500 which is configured to have the SoC 502 to function as a coordinator for broadcasting new routing instructions to each ECU 506A, 506B (e.g., on a data distribution service (DDS) bus). In this example, each ECU 506A, 506B communicates directly with one of the modems 504A, 504B through the switch 508. In one or more embodiments or examples, controlling the communication of the data includes transmitting and/or providing, from the SoC 502 to at least one of the plurality of ECUs 506A, 506B, a configuration signal 622 based on the performance parameters 620A, 620B. In some examples, controlling the communication includes transmitting and/or providing the configuration signal 622 to each of the plurality of ECUs 506A, 506B. In one or more embodiments or examples, the configuration signal 622 is indicative of which of the first modem 504A or the second modem 504B ECU 506A, 506B is to communicate with. In some embodiments, the configuration signal 622 includes routing instructions. In some examples, the routing instructions include an instruction indicating which modem 504A, 504B is selected and recommended to perform the communication with each of the plurality of ECUs 506A, 506B. In some examples, each of the plurality of ECUs 506A, 506B accepts the routing instructions or rejects (e.g., ignores) the routing instructions. In some examples, each of the plurality of ECUs 506A, 506B determines which of the modems 504A, 504B to communicate with based on the configuration signal 622. Accordingly, the SoC 502 communicates directly with the ECUs 506A, 506B for providing the configuration signal(s) 622.

In certain examples, the SoC 502 also communicates with the modems 504A, 504B. In one or more embodiments or examples, the SoC 502 is configured to transmit, to the modems 504A, 504B, a class indicator based on the priority parameter. In certain implementations, the class indicator is indicative of a class of quality of service associated with the communication of the data. For example, the class indicator includes one or more of: a quality-of-service class identifier (QCI) and access point name (APN) (such as general APN or prioritized APN). In one or more examples or embodiments, the SoC 502 instructs each modem 504A, 504B to use a specific QCI based on the priority parameter of the data. In certain examples, an APN is associated with a server (e.g., networks 510A, 510B) to which each of the plurality of ECUs 506A, 506B intends to send traffic data. An APN level identifies a connection between a corresponding ECU (e.g., ECU 506A, 506B) and a corresponding network (e.g., network 510A, 510B) for communication of the data in certain examples. In other words, different types of data communication (e.g., different data communication scenarios), including e.g., ride-sharing, telecommunication, system maintenance and/or assistance, entertainment, can have different APNs. In some examples, the data to be communicated by each of the plurality of ECUs 506A, 506B via the modems 504A, 50B to each of the networks 510A, 510B is associated with QCIs. In other words, the data to be communicated by each of the plurality of ECUs 506A, 506B can be prioritized based on the QCIs. For example, a communication of data between a corresponding ECU (e.g., ECU 506A, 506B) and a corresponding network (e.g., network 510A, 510B) is associated with an APN and/or a QCI.

In certain examples, the SoC 502 also communicates with servers (e.g., in networks 510A, 510B). In one or more embodiments or examples, the SoC 502 transmits, to a server, a server configuration signal based on the performance parameters 620A, 620B. In one or more embodiments or examples, the server configuration signal is indicative of which of modem 504A, 504B the server is to communicate with, such as for downlink transmission. Put differently, the SoC 502 instructs the servers on which modem 504A, 504B to use to transmit data to the vehicle 550. For example, the server configuration signal includes an internet protocol (IP) address associated with each modem 504A, 504B. This can act as the downlink or counter aspect of providing the ECUs 506A, 506B with the configuration signal 622 for uplink data.

FIG. 6 illustrates an example system 600 having a SoC 602 which communicates instructions directly to the switch 508 indicating which of the modems 504A, 504B each of a plurality of ECUs 506A, 506B is to communicate with. The SoC 602 can optionally communicate with the ECUs 506A, 506B as discussed with respect to FIG. 5. In some examples, the SoC 602 includes any and/or all elements discussed with respect to SoC 502. In one or more embodiments or examples, the SoC 602 transmits to the switch 508 (which is communicably coupled with the plurality of ECUs 506A, 506B), the first modem 504A, and the second modem 504B), a switch configuration signal 722 based on the performance parameters 620A, 620B. In other words, in some examples, the SoC 602 determines which of the modems 504A, 504B serves each of the plurality of ECUs 506A, 506B based on a cellular performance parameter associated with the modems 504A, 504B. In one or more embodiments or examples, the switch configuration signal 722 is indicative of which of the modems 504A, 504B the switch 508 is to communicate the data with. In some examples, the switch 508 routes and/or reroutes traffic data obtained from or associated with each of the plurality of ECUs 506A, 506B based on the switch configuration signal 722. For example, the SoC 602 assigns the plurality of ECUs 506A, 506B to the modems 504A, 504B by means of the switch 508. For example, the SoC 602 performs dynamic orchestration of modems 504A, 504B via the switch 508. In other words, the SoC 602 can communicate with the switch 508 to dynamically change the traffic route of each ECU 506A, 506B by changing routing during runtime (e.g., in real time and/or on the fly). In certain examples, the switch 508 routes and/or reroutes traffic data associated with each of the plurality of ECUs 506A, 506B, while ensuring interoperability and compatibility with hardware and software architectural structures (e.g., hardware components and/or software-based components) of the vehicle 550.

FIG. 7 illustrates an example system 700 having SoC 702 which communicates directly to the switch 508. The SoC 702 can optionally also communicate with the ECUs 506A, 506B as discussed with respect to FIG. 5 and/or communicate with the switch 508 as discussed with respect to FIG. 6. The SoC 702 can include any and/or all elements discussed with respect to SoC 502 and SoC 602. In one or more embodiments or examples, the SoC 702 receives (e.g., obtains), the data (represented by the dashed lines of FIG. 7 interacting with the SoC 702). In one or more embodiments or examples, the SoC 702 schedules transmission of the data based on the performance parameters 620A, 620B. In one or more embodiments or examples, the SoC 702 transmits the data based on the scheduling to one of: the first modem 504A, the second modem 504B, and an ECU of the plurality of ECUs 506A, 506B. In other words, the SoC 702 acts as a forwarding daemon (e.g., gateway, using port forwarding) and passes the data to the modems 504A, 504B and/or the ECUs 506A, 506B based on their priority parameters and/or based on the available cellular resources. In some examples, the SoC 702 receives the data from the switch 508 and sends the data back to the switch 508 as illustrated by double arrow 724. In certain examples, the at least one SoC 702 determines which of the first modem 504A or the second modem 504B serves each of the plurality of ECUs 506A, 506B based on the first performance parameter 620A and/or the second performance parameter 620B (e.g., cellular performance parameters) and/or the data from each of the plurality of the ECUs 506A, 506B, with the data from each of the plurality of the ECUs 506A, 506B having different transmission priorities (e.g., traffic data intended to be transmitted by a first modem 504A or a second modem 504B to a cloud server). For example, upon determining which of the modems 504A, 504B each ECU 506A, 506B is to communicate with, the SoC transmits such information to the switch 508. In other words, the SoC transmits a switch configuration signal (e.g., similar to the switch configuration signal 722 of FIG. 6) for enabling the switch 508 to route and/or reroute the data associated with each of the plurality of ECUs 506A, 506B to a server (such as, network 510A, 510B). In other examples, the SoC 702 receives the data from the modems 504A, 504B and/or the ECUs 506A, 506B via the switch 508, schedules the data, and reroutes the data back to the switch 508 for distribution to the ECUs and/or modems respectively.

In some examples, the SoC 702 schedules transmission, such as prioritizes and/or orders the transmission of different data. In one or more embodiments or examples, the SoC 702 is configured to schedule the resources based on the performance parameters 620A, 620B and the priority parameter associated with the data. In some examples, the SoC 702 centralizes traffic handling, providing more control over data communication.

Referring now to FIG. 8, illustrated is a flowchart of a method or process 800 for dynamic autonomous vehicle modem orchestration. The method can be performed by a system 500, 600, 700 disclosed herein, such as an AV compute 202*f* of FIG. 2 and AV compute 400 of FIG. 4, a vehicle 102, 200, 550 of FIGS. 1, 2, 5, 6, and 7, respectively, and device 300 of FIG. 3. In some examples, the system disclosed includes at least one processor which is configured to carry out one or more of the operations of method 800. The method 800 can be performed (e.g., completely, partially, and/or the like) by another device or group of devices separate from or including system disclosed herein.

In one or more examples or embodiments, the method 800 includes any and/or all of the steps discussed above. For example, the method 800 (such as the steps of method 800) is performed using a System on a Chip (SoC). The SoC can include any and/or all details with respect to the SoC 502, 602, 702 discussed in detail above. As shown, the method 800 includes determining, at step 802, a first performance parameter indicative of a communication performance of a first modem and determining, at step 804, a second performance parameter indicative of communication performance of a second modem. The modems used in method 800 can include any and/or all of the details regarding first modem 504A and second modem 504B discussed above. In some embodiments, the method 800 includes controlling, at step 806, communication of data (e.g., information) between at least one ECUs and the first modem or second modem based on the first performance parameter and the second performance parameter. In other words, the method 800 can control data flow between the ECUs and the modems.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

Disclosed are non-transitory computer readable media comprising instructions stored thereon that, when executed by at least one processor, cause the at least one processor to carry out operations according to one or more of the methods disclosed herein.

Also disclosed are methods, non-transitory computer readable media, and systems according to any of the following items:

Item 1. A method comprising:
determining, using at least one System on a Chip (SoC), a first performance parameter indicative of communication performance of a first modem;
determining, using the at least one SoC, a second performance parameter indicative of communication performance of a second modem; and controlling, using the at least one SoC, communication of data between at least one of a plurality of Electronic Control Units (ECUs) and the first modem or the second modem based on the first performance parameter and the second performance parameter.

Item 2. The method of item 1, further comprising:
obtaining a priority parameter associated with the data;
wherein controlling the communication of the data comprises controlling communication of the data between each of the plurality of ECUs and one of the first modem or the second modem further based on the priority parameter.

Item 3. The method of any of the preceding items, wherein controlling the communication of the data comprises:
transmitting, from the at least one SoC to at least one of the plurality of ECUs, a configuration signal indicative of which of the first modem or the second modem each of the plurality of ECUs is to communicate with, based on the first performance parameter and the second performance parameter.

Item 4. The method of item 3 as dependent on item 2, wherein controlling the communication of the data comprises:
transmitting, from the at least one SoC to the first modem and the second modem, a class indicator indicative of a class of quality of service for the communication of the data, based on the priority parameter.

Item 5. The method of items 2-4, wherein controlling the communication of the data comprises:
transmitting, from the at least one SoC to a server, a server configuration signal indicative of which of the first modem or the second modem the server is to communicate with based on the first performance parameter and the second performance parameter.

Item 6. The method of any of the preceding items, wherein controlling the communication of the data comprises:
transmitting, from the at least one SoC to a switch communicably coupled with the plurality of ECUs, the first modem, and the second modem, a switch configuration signal indicative of which of the first modem or the second modem the switch is to communicate the data with based on the first performance parameter and the second performance parameter.

Item 7. The method of any of the preceding items, wherein controlling the communication of the data comprises:
receiving, by the at least one SoC, the data;
scheduling, by the at least one SoC, transmission of the data based on the first performance parameter and the second performance parameter; and transmitting, by the at least one SoC, the data based on the scheduling to one of: the first modem, the second modem, and an ECU of the plurality of ECUs.

Item 8. The method of item 7, wherein scheduling the transmission of the data comprises:
scheduling the resources based on the first performance parameter, the second performance parameter, and the priority parameter associated with the data.

Item 9. A system comprising:
a first modem;
a second modem;
a plurality of Electronic Control Units (ECUs); and at least one System on a Chip (SoC) communicably coupled with the first modem, the second modem, and each of the plurality of ECUs, with the at least one SoC being configured to carry out operations comprising:
determining a first performance parameter indicative of communication performance of a first modem;
determining a second performance parameter indicative of communication performance of a second modem; and controlling communication of data between at least one of a plurality of ECUs and the first modem or the second modem based on the first performance parameter and the second performance parameter.

Item 10. The system of item 9, the operations further comprising:
obtaining a priority parameter associated with the data;
wherein controlling the communication of the data comprises controlling communication of the data between each of the plurality of ECUs and one of the first modem or the second modem further based on the priority parameter.

Item 11. The system of items 9-10, wherein controlling the communication of the data comprises:
transmitting, from the at least one SoC to at least one of the plurality of ECUs, a configuration signal indicative of which of the first modem or the second modem each of the plurality of ECUs is to communicate with, based on the first performance parameter and the second performance parameter.

Item 12. The system of item 11 as dependent on item 10, wherein controlling the communication of the data comprises:
transmitting, from the at least one SoC to the first modem and the second modem, a class indicator indicative of a class of quality of service for the communication of the data, based on the priority parameter.

Item 13. The system of items 11-12, wherein controlling the communication of the data comprises:
transmitting, from the at least one SoC to a server, a server configuration signal indicative of which of the first modem or the second modem the server is to communicate with based on the first performance parameter and the second performance parameter.

Item 14. The system of items 9-13, wherein controlling the communication of the data comprises:
transmitting, from the at least one SoC to a switch communicably coupled with the plurality of ECUs, the first modem, and the second modem, a switch configuration signal indicative of which of the first modem or the second modem the switch is to communicate the data with based on the first performance parameter and the second performance parameter.

Item 15. The system of items 9-14, wherein controlling the communication of the data comprises:
receiving, by the at least one SoC, the data;
scheduling, by the at least one SoC, transmission of the data based on the first performance parameter and the second performance parameter; and transmitting, by the at least one SoC, the data based on the scheduling to one of: the first modem, the second modem, and an ECU of the plurality of ECUs.

Item 16. The system of item 15, wherein scheduling the transmission of the data comprises:
scheduling the resources based on the first performance parameter, the second performance parameter, and the priority parameter associated with the data.

Item 17. A non-transitory computer readable medium comprising instructions stored thereon that, when executed by at least one System on a Chip (SoC), cause the at least one SoC to carry out operations comprising:
determining a first performance parameter indicative of communication performance of a first modem;
determining a second performance parameter indicative of communication performance of a second modem; and controlling communication of data between at least one of a plurality of ECUs and the first modem or the second modem based on the first performance parameter and the second performance parameter.

Item 18. The non-transitory computer readable medium of item 17, further comprising: obtaining a priority parameter associated with the data,
wherein controlling the communication of the data comprises controlling communication of the data between each of the plurality of ECUs and one of the first modem or the second modem further based on the priority parameter.

Item 19. The non-transitory computer readable medium of items 17-18, wherein controlling the communication of the data comprises:
transmitting, from the at least one SoC to at least one of the plurality of ECUs, a configuration signal indicative of which of the first modem or the second modem each of the plurality of ECUs is to communicate with, based on the first performance parameter and the second performance parameter.

Item 20. The non-transitory computer readable medium of item 19 as dependent on item 18, wherein controlling the communication of the data comprises:
transmitting, from the at least one SoC to the first modem and the second modem, a class indicator indicative of a class of quality of service for the communication of the data, based on the priority parameter.

Item 21. The non-transitory computer readable medium of items 19-20, wherein controlling the communication of the data comprises:
transmitting, from the at least one SoC to a server, a server configuration signal indicative of which of the first modem or the second modem the server is to communicate with based on the first performance parameter and the second performance parameter.

Item 22. The non-transitory computer readable medium of items 17-21, wherein controlling the communication of the data comprises:
transmitting, from the at least one SoC to a switch communicably coupled with the plurality of ECUs, the first modem, and the second modem, a switch configuration signal indicative of which of the first modem or the second modem the switch is to communicate the data with based on the first performance parameter and the second performance parameter.

Item 23. The non-transitory computer readable medium of items 17-22, wherein controlling the communication of the data comprises:
receiving, by the at least one SoC, the data;
scheduling, by the at least one SoC, transmission of the data based on the first performance parameter and the second performance parameter; and
transmitting, by the at least one SoC, the data based on the scheduling to one of: the first modem, the second modem, and an ECU of the plurality of ECUs.

Item 24. The non-transitory computer readable medium of item 23, wherein scheduling the transmission of the data comprises:
scheduling the resources based on the first performance parameter, the second performance parameter, and the priority parameter associated with the data.

What is claimed is:

1. A method implemented by at least one System on a Chip (SoC) comprising:
determining a first modem performance parameter indicative of communication performance of a first modem;
determining a second modem performance parameter indicative of communication performance of a second modem;
determining, based on the first modem performance parameter and the second modem performance parameter, that both a first Electronic Control Unit (ECU) of a plurality of ECUs and a second ECU of a plurality of ECUs should communicate with the first modem;
controlling communication of first data between the first ECU and the first modem;
monitoring communication between the first ECU and the first modem to determine an updated first modem performance parameter; and
based on the updated first modem performance parameter, routing communication of second data from the second ECU to the second modem.

2. The method of claim 1, further comprising:
obtaining a first priority parameter associated with the first data and a second priority parameter associated with the second data;
wherein determining that both the first ECU and the second ECU should communicate with the first modem is further based on the first priority parameter and second priority parameter.

3. The method of claim 1, wherein controlling the communication of the first data comprises:
transmitting, from the at least one SoC to the first ECU, a configuration signal indicating that the first ECU is to communicate with the first modem based on the first modem performance parameter and the second modem performance parameter.

4. The method of claim 2, wherein controlling the communication of the first data comprises:
transmitting, from the at least one SoC to the first modem, a class indicator indicative of a class of quality of service for the communication of the first data based on the first priority parameter.

5. The method of claim 1, wherein controlling the communication of the first data comprises:
transmitting, from the at least one SoC to a server, a server configuration signal indicating that the server is to communicate with the first modem based on the first modem performance parameter and the second modem performance parameter.

6. The method of claim 1, wherein controlling the communication of the first data comprises:
transmitting, from the at least one SoC to a switch communicably coupled with the plurality of ECUs, the first modem, and the second modem, a switch configuration signal indicating that the switch is to communicate the first data with the first modem based on the first modem performance parameter and the second modem performance parameter.

7. The method of claim 2, wherein controlling the communication of the first data comprises:
receiving, by the at least one SoC, the first data;
scheduling, by the at least one SoC, transmission of the first data based on the first modem performance parameter and the second modem performance parameter; and
transmitting, by the at least one SoC, the first data based on the scheduling to one of: the first modem, the second modem, and an ECU of the plurality of ECUs.

8. A system comprising:
a first modem;
a second modem;
a plurality of Electronic Control Units (ECUs); and
at least one System on a Chip (SoC) communicably coupled with the first modem, the second modem, and each of the plurality of ECUs, with the at least one SoC being configured to carry out operations comprising:
- determining a first modem performance parameter indicative of communication performance of a first modem;
- determining a second modem performance parameter indicative of communication performance of a second modem;
- determining, based on the first modem performance parameter and the second modem performance parameter, that both a first Electronic Control Unit (ECU) of a plurality of ECUs and a second ECU of a plurality of ECUs should communicate with the first modem;
- controlling communication of first data between the first ECU and the first modem;
- monitoring communication between the first ECU and the first modem to determine an updated first modem performance parameter; and
- based on the updated first modem performance parameter, routing communication of second data from the second ECU to the second modem.

9. The system of claim 8, the operations further comprising:
- obtaining a priority parameter associated with the first data;
- wherein determining that both the first ECU and the second ECU should communicate with the first modem is further based on the priority parameter.

10. The system of claim 8, wherein controlling the communication of the first data comprises:
- transmitting, from the at least one SoC to of the first ECUs, a configuration signal indicating that of the first ECU is to communicate with the first modem based on the first modem performance parameter and the second modem performance parameter.

11. The system of claim 9, wherein controlling the communication of the first data comprises:
- transmitting, from the at least one SoC to the first modem, a class indicator indicative of a class of quality of service for the communication of the first data based on the priority parameter.

12. The system of claim 8, wherein controlling the communication of the first data comprises:
- transmitting, from the at least one SoC to a server, a server configuration signal indicating that the server is to communicate with the first modem based on the first modem performance parameter and the second modem performance parameter.

13. The system of claim 8, wherein controlling the communication of the first data comprises:
- transmitting, from the at least one SoC to a switch communicably coupled with the plurality of ECUs, the first modem, and the second modem, a switch configuration signal indicating that the switch is to communicate the first data with the first modem based on the first modem performance parameter and the second modem performance parameter.

14. The system of claim 9, wherein controlling the communication of the first data comprises:
- receiving, from the at least one SoC, the first data;
- scheduling, from the at least one SoC, transmission of the first data based on the first modem performance parameter and the second modem performance parameter; and
- transmitting, from the at least one SoC, the first data based on the scheduling to one of: the first modem, the second modem, and an ECU of the plurality of ECUs.

15. The system of claim 14, wherein scheduling the transmission of the first data comprises:
- scheduling computing resources based on the first modem performance parameter, the second modem performance parameter, and the priority parameter associated with the first data.

16. A non-transitory computer readable medium comprising instructions stored thereon that, when executed by at least one System on a Chip (SoC), cause the at least one SoC to carry out operations comprising:
- determining a first modem performance parameter indicative of communication performance of a first modem;
- determining a second modem performance parameter indicative of communication performance of a second modem;
- determining, based on the first modem performance parameter and the second modem performance parameter, that both a first Electronic Control Unit (ECU) of a plurality of ECUs and a second ECU of a plurality of ECUs should communicate with the first modem;
- controlling communication of first data between the first ECU and the first modem;
- monitoring communication between the first ECU and the first modem to determine an updated first modem performance parameter; and
- based on the updated first modem performance parameter, routing communication of second data from the second ECU to the second modem.

17. The non-transitory computer readable medium of claim 16, further comprising:
- obtaining a priority parameter associated with the first data;
- wherein determining that both the first ECU and the second ECU should communicate with the first modem is further based on the priority parameter.

18. The non-transitory computer readable medium of claim 16, wherein controlling the communication of the first data comprises:
- transmitting, from the at least one SoC to of the first ECUs, a configuration signal indicating that of the first ECU is to communicate with the first modem based on the first modem performance parameter and the second modem performance parameter.

19. The non-transitory computer readable medium of claim 17, wherein controlling the communication of the first data comprises:
- transmitting, from the at least one SoC to the first modem, a class indicator indicative of a class of quality of service for the communication of the first data based on the priority parameter.

20. The method of claim 6, wherein controlling the communication of the second data comprises:
- transmitting, from the at least one SoC to the switch, a second switch configuration signal indicating that the switch is to communicate the second data with the second modem based on the updated first modem performance parameter and the second modem performance parameter.

* * * * *